United States Patent
Kitawaki (10) Patent No.: US 10,663,668 B2
(45) Date of Patent: May 26, 2020

(54) OPTICAL SPLITTER

(71) Applicant: SHIMADZU CORPORATION, Kyoto (JP)

(72) Inventor: Masaaki Kitawaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/150,293

(22) Filed: Oct. 3, 2018

(65) Prior Publication Data

US 2019/0302368 A1  Oct. 3, 2019

(30) Foreign Application Priority Data

Mar. 27, 2018 (JP) .................................. 2018-059657

(51) Int. Cl.
| | |
|---|---|
| G02B 6/293 | (2006.01) |
| G02B 26/08 | (2006.01) |
| G01J 3/10 | (2006.01) |
| G01J 3/18 | (2006.01) |
| G02B 6/35 | (2006.01) |
| G01J 3/12 | (2006.01) |

(52) U.S. Cl.
CPC ............ *G02B 6/29304* (2013.01); *G01J 3/10* (2013.01); *G01J 3/18* (2013.01); *G02B 6/3588* (2013.01); *G02B 26/0808* (2013.01); *G02B 26/0816* (2013.01); *G01J 2003/1213* (2013.01)

(58) Field of Classification Search
None
See application file for complete search history.

(56) References Cited

U.S. PATENT DOCUMENTS

| | | | | |
|---|---|---|---|---|
| 6,341,036 B1* | 1/2002 | Tearney | ............... | A61B 5/0066 |
| | | | | 359/209.1 |
| 6,441,959 B1* | 8/2002 | Yang | .................... | G02B 5/3083 |
| | | | | 356/365 |
| 7,949,019 B2* | 5/2011 | Bouma | ..................... | G01J 3/02 |
| | | | | 372/102 |
| 9,008,134 B2* | 4/2015 | Oh | ........................... | G01J 3/10 |
| | | | | 372/101 |
| 10,031,295 B2* | 7/2018 | Eberle, Jr. | ................ | G02B 6/32 |
| 2003/0156284 A1* | 8/2003 | Farr | .......................... | G01J 3/02 |
| | | | | 356/326 |

(Continued)

FOREIGN PATENT DOCUMENTS

JP  2013160701  8/2013

*Primary Examiner* — Tina M Wong
(74) *Attorney, Agent, or Firm* — JCIPRNET (57) ABSTRACT

An optical splitter includes a housing, a diffraction grating, and an optical filter. An incidence unit and an emission unit are provided in the housing. The optical filter is disposed between the emission unit and the diffraction grating in the housing. An anti-reflection coating is formed on a surface of a filter main body of the optical filter on the emission unit side. Therefore, from light dispersed by the diffraction grating and having passed through the optical filter, light reflected at a back surface of the emission unit passes through the optical filter without being reflected by a back surface of the optical filter and is directed toward the inside of the housing. As a result, light having passed through the optical filter and having a wavelength other than a target wavelength is inhibited from being emitted from an emission slit of the emission unit.

2 Claims, 5 Drawing Sheets

(56) References Cited

U.S. PATENT DOCUMENTS

| | | | |
|---|---|---|---|
| 2004/0165184 A1* | 8/2004 | Mizuno | G01J 3/14 356/326 |
| 2005/0018201 A1* | 1/2005 | de Boer | A61B 5/0059 356/479 |
| 2009/0273777 A1* | 11/2009 | Yun | G01J 3/02 356/300 |
| 2012/0029813 A1* | 2/2012 | Tajima | G08G 1/161 701/300 |
| 2017/0299433 A1* | 10/2017 | Riel | G01J 3/108 |
| 2019/0302368 A1* | 10/2019 | Kitawaki | G02B 27/1086 |

\* cited by examiner

OPTICAL SPLITTER

CROSS-REFERENCE TO RELATED APPLICATION

This application claims the priority of Japan patent application serial no. 2018-059657, filed on Mar. 27, 2018. The entirety of the above-mentioned patent application is hereby incorporated by reference herein and made a part of this specification.

BACKGROUND

Technical Field

This disclosure relates to an optical splitter in which incident light is dispersed into light according to wavelength by a diffraction grating to be emitted from an emission slit.

Description of Related Art

Conventionally, optical splitters have been used in fields in which variable-wavelength monochromatic light sources are utilized. In the optical splitter, light incident from an incidence slit is dispersed into light by wavelength by a diffraction grating. Then, the dispersed light is emitted from an emission slit (see, for example, Patent Document 1 below).

In such an optical splitter, light having a wavelength other than a target wavelength may be emitted from the emission slit due to scattering of light in the optical splitter or generation of high-order light in the diffraction grating. When light having a wavelength other than a target wavelength is used in an analysis system, for example, it will adversely affect an analysis. From this point of view, an optical splitter in which an optical filter for cutting off light having a wavelength other than a target wavelength (light serving as a noise source) is provided is used.

Figure 5:
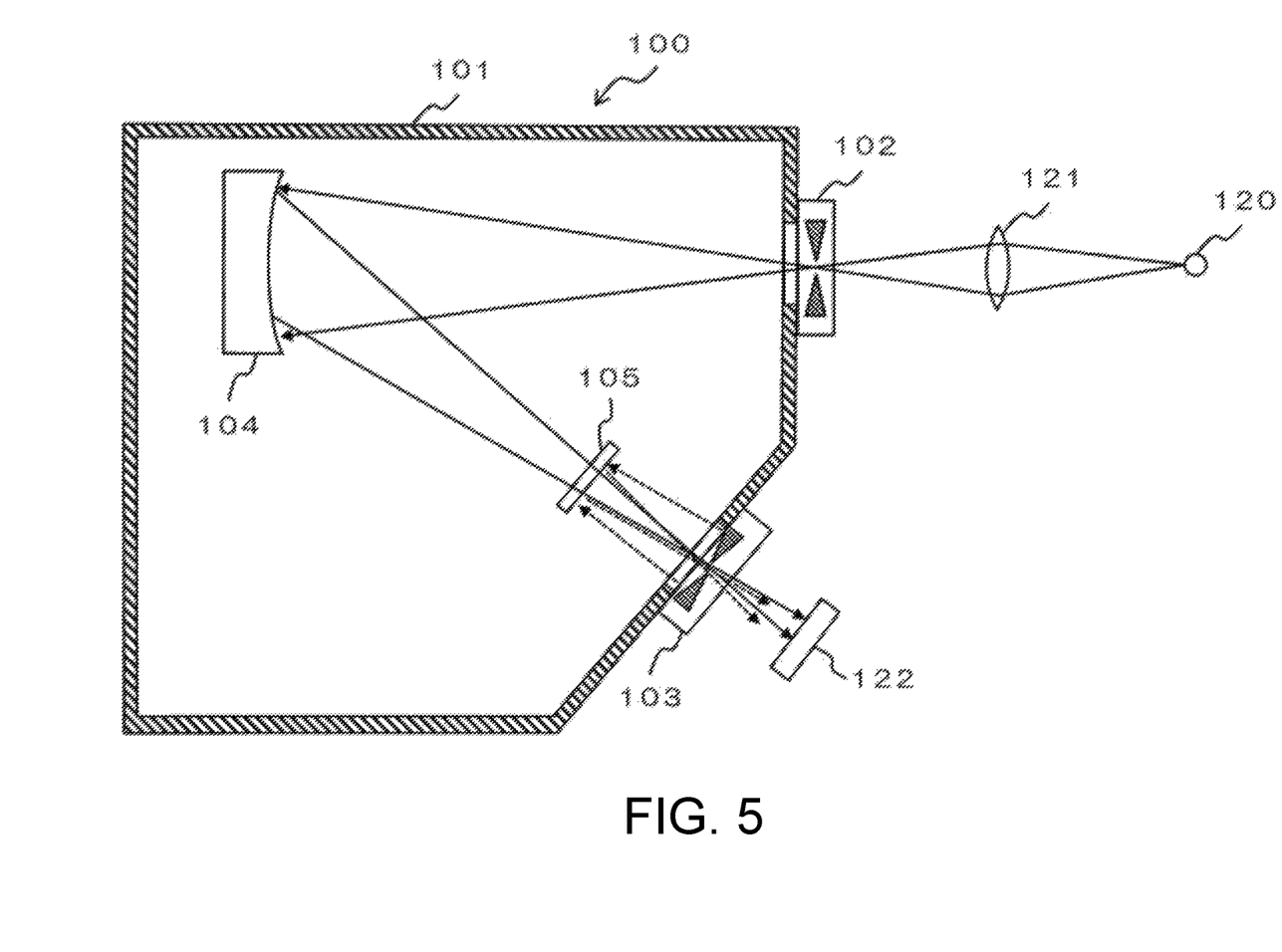
FIG. 5 is a schematic view illustrating a configuration of an optical splitter including an optical filter in which an anti-reflection coating is not formed.

For example, as illustrated in FIG. 5, providing an optical filter 105 inside the optical splitter 100 can be considered. In the example illustrated in FIG. 5, the optical splitter 100 includes a housing 101, an incidence unit 102, an emission unit 103, a diffraction grating 104, and an optical filter 105.

Each of the incidence unit 102 and the emission unit 103 is provided on the housing 101. An incidence slit is formed in the incidence unit 102, and an emission slit is formed in the emission unit 103. The diffraction grating 104 and the optical filter 105 are disposed in the housing 101. The optical filter 105 is disposed to face the emission unit 103 with a space therebetween. The optical filter 105 is configured to transmit only light within a predetermined wavelength range.

When light is emitted from a light source 120 disposed around the optical splitter 100, the light is condensed by the condenser lens 121, passes through the incidence slit of the incidence unit 102, and is directed toward the inside of the housing 101. The light having passed through the incidence slit is diffracted by the diffraction grating 104 to be optically split into light by wavelength. Then, light optically split into a specific wavelength passes through the optical filter 105 and is emitted outside of the housing 101 via the emission slit of the emission unit 103. Then, the light emitted outside of the housing 101 is detected by a detector 122. At this time, most of light serving as a noise source (light having a wavelength other than a target wavelength) directed toward the emission unit 103 is cut off by the optical filter 105.

In the optical splitter 100, light having a wavelength significantly different from the target wavelength is cut off by the optical filter 105. On the other hand, light not having the target wavelength but having a wavelength close to the target wavelength passes through the optical filter 105. In the optical splitter 100, there are cases in which such light having a wavelength other than the target wavelength and having passed through the optical filter 105 is emitted from the emission slit.

Specifically, in the optical splitter 100, as illustrated by a dotted line in FIG. 5, there are cases in which light having a wavelength other than the target wavelength and having passed through the optical filter 105 is emitted from the emission slit after repeating reflection between a back surface (a surface on the optical filter 105 side) of the emission unit 103 and a back surface (a surface on the emission unit 103 side) of the optical filter 105. Since the light is light having a wavelength other than the target wavelength, it will adversely affect subsequent analysis or the like.

[Patent Document 1] Japanese Unexamined Patent Application Publication, First Publication No. 2013-160701

SUMMARY

The disclosure has been made in view of the above circumstances, and an objective of the disclosure is to provide an optical splitter in which emission of light having a wavelength other than a target wavelength can be inhibited.

An optical splitter according to the disclosure includes a housing, a diffraction grating, and an optical filter. In the housing, light is incident therein and the incident light is emitted from an emission slit. The diffraction grating is provided in the housing, and disperses light incident into the housing into light by wavelength. The optical filter is provided between the diffraction grating and the emission slit and transmits only light of a selected wavelength to emit the light from the emission slit. An anti-reflection coating is formed on a surface of each of the optical filters at least on the emission slit side.

DESCRIPTION OF THE EMBODIMENTS (1) An optical splitter according to the disclosure includes a housing, a diffraction grating, and an optical filter. In the housing, light is incident therein and the incident light is emitted from an emission slit. The diffraction grating is provided in the housing, and disperses light incident into the housing into light by wavelength. The optical filter is provided between the diffraction grating and the emission slit and transmits only light of a selected wavelength to emit the light from the emission slit. An anti-reflection coating is formed on a surface of each of the optical filters at least on the emission slit side.

According to such a configuration, in the optical splitter, an anti-reflection coating is formed on the surface of the optical filter on the emission slit side.

Therefore, from light dispersed by the diffraction grating and having passed through the optical filter, light reflected by a back surface of a portion in which the emission slit is formed (a surface on the optical filter side) passes through the optical filter and is directed toward the inside of the housing without being reflected by a back surface of the optical filter (a surface on the emission slit side).

As a result, light having passed through the optical filter and having a wavelength other than a target wavelength can be inhibited from repeating reflection between the back surface of the portion in which the emission slit is formed (the surface on the optical filter side) and the back surface of the optical filter (the surface on the emission slit side), and being emitted from the emission slit.

Therefore, emission of light having a wavelength other than the target wavelength can be inhibited in the optical splitter.

(2) In addition, the optical splitter may further include a filter switching mechanism. The filter switching mechanism switches between a plurality of optical filters to dispose any one of the optical filters between the diffraction grating and the emission slit. The anti-reflection coating may be formed on a surface of each of the optical filters at least on the emission slit side.

According to such a configuration, in the optical splitter, an optical filter selected by switching of the filter switching mechanism is disposed between the diffraction grating and the emission slit. Then, light having passed through the optical filter is emitted from the emission slit.

Therefore, it is possible to select and use an optical filter of a predetermined wavelength range from among the plurality of optical filters.

According to the disclosure, from light dispersed by the diffraction grating and having passed through the optical filter, light reflected by a back surface at the emission unit filter passes through the optical filter without being reflected by a back surface of the optical filter and is directed toward the inside of the housing. As a result, light having passed through the optical filter and having a wavelength other than a target wavelength can be inhibited from repeating reflection between the back surface at the emission unit and the back surface of the optical filter, and being emitted from the emission slit.

1. Configuration of Optical Splitter

Figure 1:
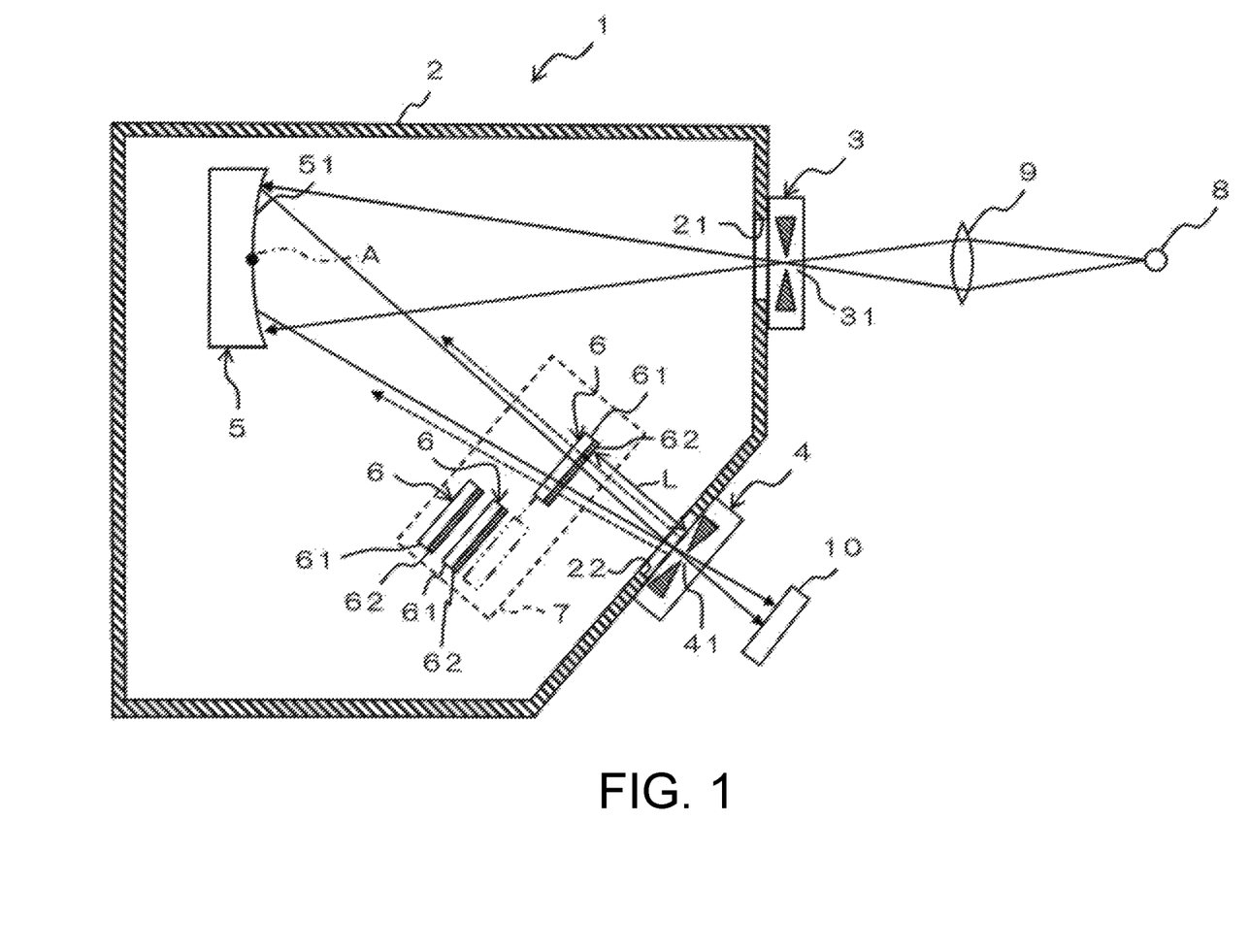
FIG. 1 is a schematic view illustrating a configuration of an optical splitter according to one embodiment of the disclosure.

FIG. 1 is a schematic view illustrating a configuration of an optical splitter 1 according to one embodiment of the disclosure.

The optical splitter 1 is a monochromator for separating light from a light source 8, and the light from the light source 8 is condensed by a condenser lens 9 and is incident into the optical splitter 1. Also, the light emitted from the optical splitter 1 is detected by a detector 10. The optical splitter 1 can be applied to various analysis systems such as a thickness meter in addition to a spectrophotometer.

The light source 8 is configured by, for example, halogen lamps, xenon lamps, light emitting diodes (LEDs), or the like.

The condenser lens 9 constitutes an optical system for guiding light from the light source 8 to the optical splitter 1.

The optical splitter 1 includes, for example, a housing 2, an incidence unit 3, an emission unit 4, a diffraction grating 5, an optical filter 6, and a filter switching mechanism 7.

The housing 2 is formed in a box shape. An incidence-side opening 21 and an emission-side opening 22 are formed in the housing 2.

The incidence unit 3 is formed in a plate shape. An incidence slit 31 is formed in the incidence unit 3. The incidence unit 3 is provided in the housing 2 such that the incidence-side opening 21 is covered therewith.

The emission unit 4 is formed in a plate shape. An emission slit 41 is formed in the emission unit 4. The emission unit 4 is provided in the housing 2 such that the emission-side opening 22 is covered therewith.

The diffraction grating 5 is disposed in the housing 2. A grating surface 51 formed with a concave surface is formed in the diffraction grating 5. The diffraction grating 5 is fixed on a rotating body (not illustrated) and is rotatable around a rotation axis A.

In the optical splitter 1, a plurality of optical filters 6 are provided in the housing 2. The optical filter 6 is configured to transmit only light having a wavelength selected by reflection or absorption (only light within a predetermined wavelength range). Each of the optical filters 6 has a configuration in which an anti-reflection coating 62 serving as a coating (AR coating) for preventing reflection is formed on a surface of a plate-shaped filter main body 61. The anti-reflection coating 62 is formed on a surface on one side of the filter main body 61. In the plurality of optical filters 6, a wavelength range that can be transmitted by one optical filter 6 is different from a wavelength range that can be transmitted by another optical filter 6. That is, in the optical splitter 1, a plurality of optical filters 6 each having different transmittable wavelength ranges are provided.

The anti-reflection coating 62 of the optical filter 6 is, for example, a film formed of magnesium fluoride ($MgF_2$). The anti-reflection coating 62 is formed on the filter main body 61 by, for example, vapor deposition.

The filter switching mechanism 7 is configured to switch between the plurality of optical filters 6 so that any one of the optical filters 6 is disposed between the emission unit 4 (the emission slit 41) and the diffraction grating 5. For example, the filter switching mechanism 7 includes a rotating body (not illustrated), and each of the optical filters 6 is provided on the rotating body. Also, when the rotating body rotates, any one of the optical filters 6 is disposed between the emission slit 41 and the diffraction grating 5. Further, the filter switching mechanism 7 may be configured to select any one of the optical filters 6 to be disposed between the emission slit 41 and the diffraction grating 5, and may have a configuration different from the above-described configuration. Each optical filter 6 is disposed such that the anti-reflection coating 62 faces the emission slit 41 side.

When the optical splitter 1 is used, first, one of the optical filters 6 is disposed between the emission unit 4 (the emission slit 41) and the diffraction grating 5 by the filter switching mechanism 7. At this time, the optical filter 6 having an appropriate wavelength range for transmittable light is selected and disposed. Further, the optical filter 6 is disposed in the vicinity of the emission unit 4 (the emission slit 41) between the emission unit 4 (the emission slit 41) and the diffraction grating 5. Specifically, the optical filter 6 is disposed at a distance from the emission unit 4 (the emission slit 41) such that the anti-reflection coating 62 faces the emission unit 4 (the emission slit 41). At this time, the optical filter 6 is disposed parallel to the emission unit 4 (a back surface at the emission unit 4). Further, a dimension L between the optical filter 6 and the emission unit 4 at this time is a distance from an intermediate position between a position of light separation due to the diffraction grating 5 and a position at which the light is emitted to the emission slit 41, other than an optical axis along which light is incident on the diffraction grating 5. For example, the dimension L between the optical filter 6 and the emission unit 4 is 10 to 60 mm in an optical system in which a focal distance thereof is 120 mm.

When light is emitted from the light source 8, the light is condensed by the condenser lens 9, passes through the incidence slit 31 of the incidence unit 3, and is directed toward the inside of the housing 2. The light that has passed through the incidence slit 31 reaches the grating surface 51 of the diffraction grating 5 while spreading and is optically split into light by wavelength by being diffracted by the grating surface 51. Further, the diffraction grating 5 is rotated around the rotation axis A to be disposed at a predetermined position (position of a predetermined angle). As a result, light having a specific wavelength corresponding to a rotation angle of the diffraction grating 5 is directed toward the emission unit 4.

The light of the specific wavelength that has been optically split passes through the optical filter 6 and is emitted outside of the housing 2 via the emission slit 41 of the emission unit 4. Then, the light emitted outside of the housing 2 is detected by the detector 10. At this time, most of light serving as a noise source (light having a wavelength other than a target wavelength) directed toward the emission unit 4 is cut off by the optical filter 6.

At this time, light not having the target wavelength but having a wavelength close to the target wavelength passes through the optical filter 6. As illustrated by a dotted line in FIG. 1, this light (light having a wavelength other than the target wavelength and having passed through the optical filter 6) is reflected by a back surface (a surface on the optical filter 6 side) of the emission unit 4 and then directed toward the optical filter 6. As described above, the anti-reflection coating 62 is formed on a surface of the filter main body 61 of the optical filter 6 on the emission unit 4 side. Therefore, the light reflected by the back surface (the surface on the optical filter 6 side) of the emission unit 4 passes through the optical filter 6 without being reflected by the back surface (a surface on the emission unit 4 side) of the optical filter 6, and is directed toward the inside of the housing 2. That is, light having a wavelength other than the target wavelength and having passed through the optical filter 6 is reflected once by the back surface (the surface on the optical filter 6 side) of the emission unit 4, and then directed toward the inside of the housing 2 without repetition of reflection.

Further, the back surface at the emission unit 4 refers to a surface on an inner side of the emission unit 4 in a direction in which the emission unit 4 and the optical filter 6 face each other, and the back surface of the optical filter 6 refers to a surface on an inner side of the optical filter 6 in the direction in which the emission unit 4 and the optical filter 6 face each other.

Therefore, light having a wavelength other than the target wavelength is inhibited from repeating reflection between the back surface (the surface on the optical filter 6 side) of the emission unit 4 and the back surface (the surface on the emission unit 4 side) of the optical filter 6, and being emitted from the emission slit 41. As a result, in the optical splitter 1, emission of light having a wavelength other than the target wavelength can be inhibited.

2. A Reflectance of the Optical Filter and a Light Intensity Distribution

Figure 2:
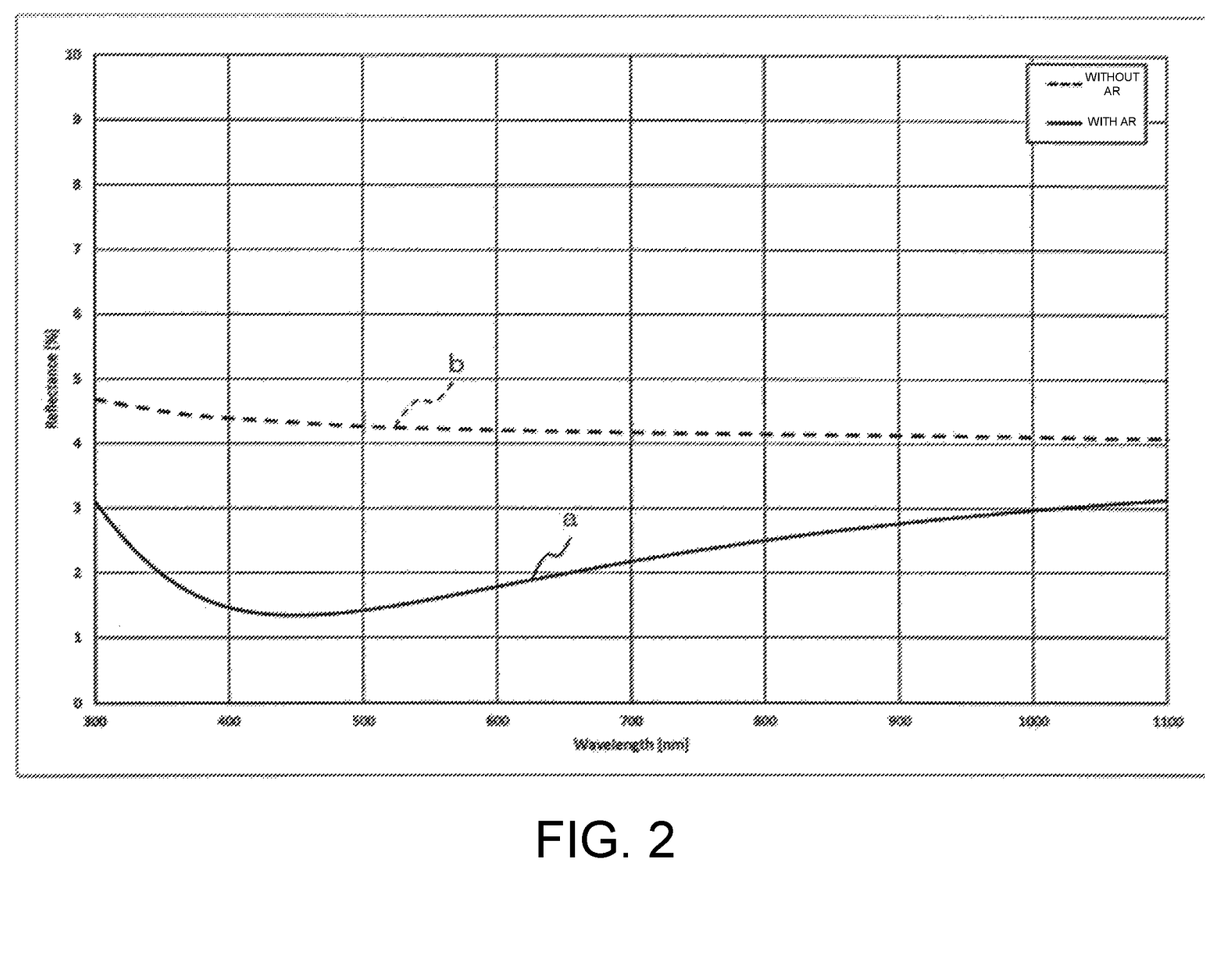
FIG. 2 is a graph showing a reflectance of an optical filter in the optical splitter of FIG. 1.

FIG. 2 is a graph showing a reflectance of the optical filter 6 of the optical splitter 1. In FIG. 2, a reflectance (reflectance of light) of the filter main body 61 at a portion in which the anti-reflection coating 62 formed of magnesium fluoride ($MgF_2$) is provided is illustrated by a graph a, and a reflectance (reflectance of light) of the filter main body 61 at a portion in which the anti-reflection coating 62 is not provided is illustrated by a graph b. Further in FIG. 2, a vertical axis represents a reflectance of light, and a horizontal axis represents a wavelength of light.

It can be confirmed from FIG. 2 that a reflectance of the portion in which the anti-reflection coating 62 is provided is low over the entire range of wavelengths. Particularly, when the anti-reflection coating 62 is formed of magnesium fluoride ($MgF_2$), it can be confirmed that the reflectance is the lowest in a wavelength region of 400 to 500 nm.

Figure 3:
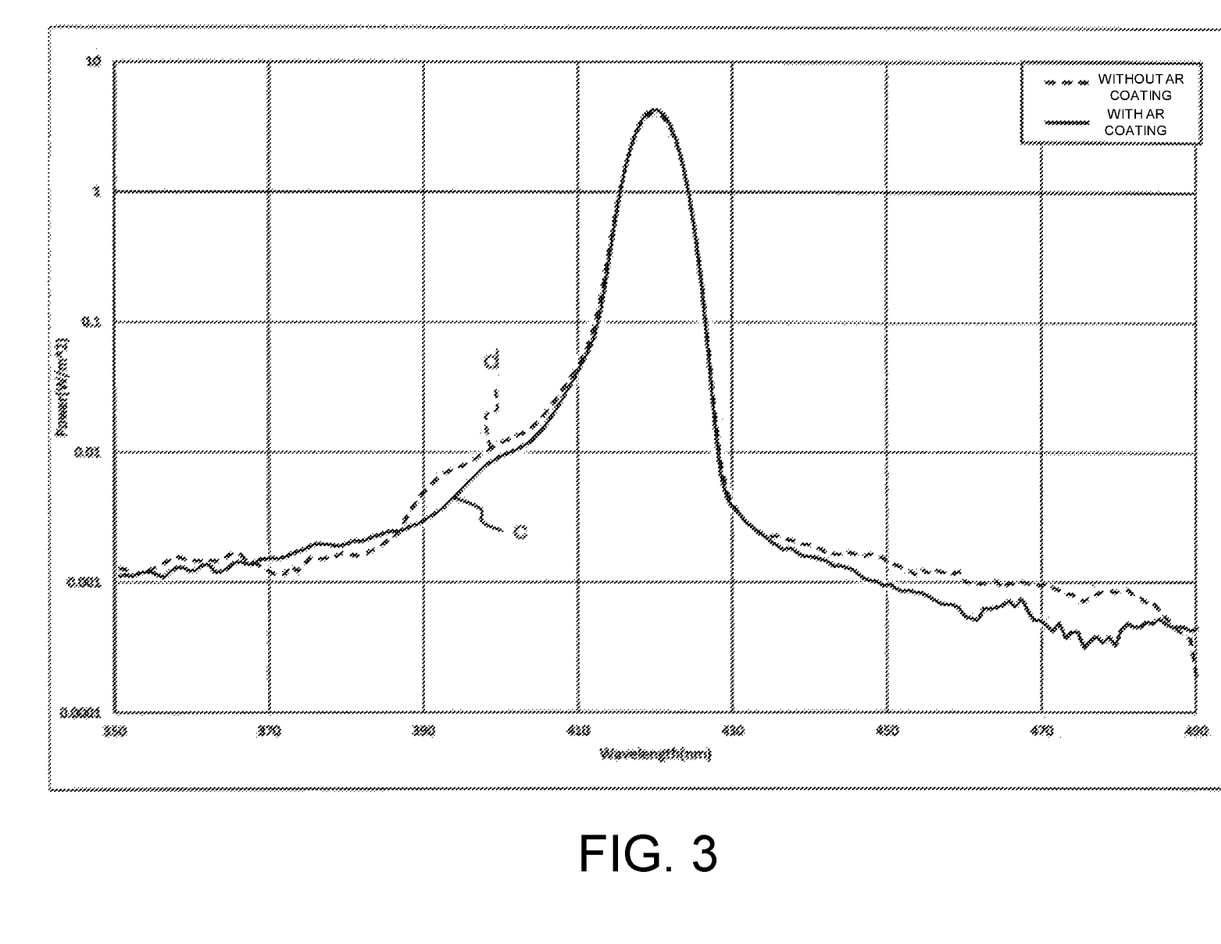
FIG. 3 is a graph showing a relationship between a wavelength and an intensity of light emitted from the optical splitter, and is a graph when a wavelength of the light emitted from the optical splitter is set to 420 nm.

FIG. 3 is a graph showing a relationship between a wavelength and an intensity of light emitted from the optical splitter, and is a graph when a wavelength of the light emitted from the optical splitter is set to 420 nm. In FIG. 3, an intensity distribution of emission light in the optical splitter 1 (see FIG. 1) is illustrated by a solid line graph c, and an intensity distribution of emission light in an optical splitter 100 (see FIG. 5) is illustrated by a dotted line graph d.

Figure 4:
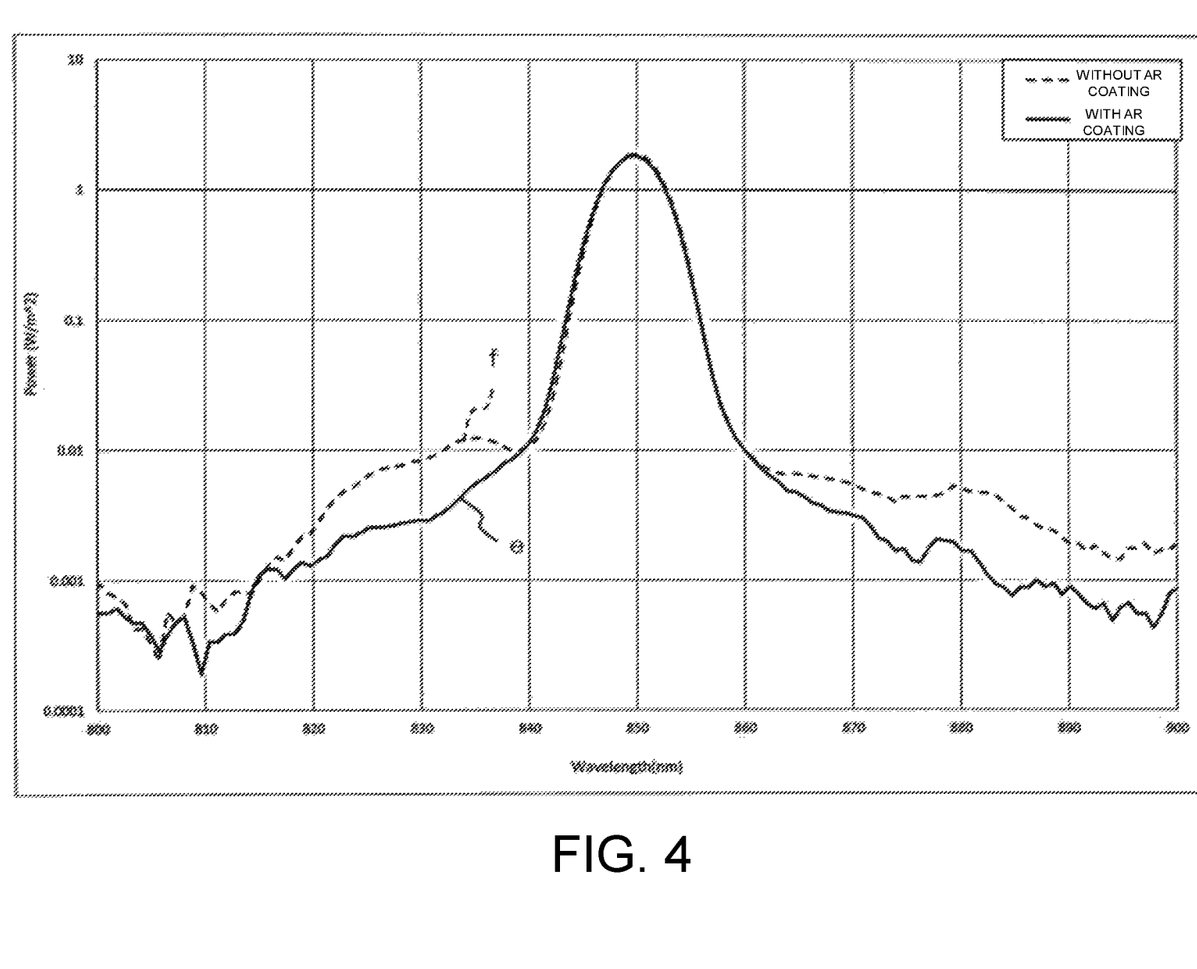
FIG. 4 is a graph showing a relationship between a wavelength and an intensity of light emitted from the optical splitter, and is a graph when a wavelength of the light emitted from the optical splitter is set to 850 nm.

FIG. 4 is a graph showing a relationship between a wavelength and an intensity of light emitted from the optical splitter, and is a graph when a wavelength of the light emitted from the optical splitter is set to 850 nm. In FIG. 4, an intensity distribution of emission light in the optical splitter 1 (see FIG. 1) is illustrated by a solid line graph e, and an intensity distribution of emission light in the optical splitter 100 (see FIG. 5) is illustrated by a dotted line graph f.

That is, intensity distributions of emission light when the anti-reflection coating is provided in the optical filter of the optical splitter are illustrated by graphs c and e, and intensity distributions of emission light when the anti-reflection coating is not provided in an optical filter of the optical splitter are illustrated by graphs d and f. Further, in FIGS. 3 and 4, a vertical axis represents an intensity of light and a horizontal axis represents a wavelength of light.

From FIGS. 3 and 4, it can be confirmed that a light intensity of a wavelength other than the wavelength (420 nm or 850 nm) set as the emission light when the optical splitter 1 is used (graph c and e) is low as compared with a case in which the optical splitter 100 is used (graph d and f). From this, it can be ascertained that emission of light having a wavelength other than the target wavelength can be inhibited when the optical splitter 1 is used.

3. Operation and Effects (1) According to the present embodiment, as illustrated in FIG. 1, the optical splitter 1 includes the housing 2, the diffraction grating 5, and the optical filter 6. The incidence unit 3 and the emission unit 4 are provided in the housing 2. In the housing 2, the optical filter 6 is disposed between the emission unit 4 (emission slit 41) and the diffraction grating 5. The anti-reflection coating 62 is formed on the surface of the filter main body 61 of the optical filter 6 on the emission unit 4 (emission slit 41) side.

Therefore, from light dispersed by the diffraction grating 5 and having passed through the optical filter 6, light reflected by the back surface (the surface on the optical filter 6 side) of the emission unit 4 passes through the optical filter 6 without being reflected by the back surface (the surface on the emission unit 4 side) of the optical filter 6 and is directed toward the inside of the housing.

As a result, light having passed through the optical filter 6 and having a wavelength other than the target wavelength is inhibited from repeating reflection between the back surface (the surface on the optical filter 6 side) of the emission unit 4 and the back surface (the surface on the emission unit 4 side) of the optical filter 6, and being emitted from the emission slit 41.

Therefore, in the optical splitter 1, emission of light having a wavelength other than the target wavelength can be inhibited.

Further, in the optical splitter 1, the optical filter 6 is provided in the housing 2. Therefore, it is possible to reduce a size of the optical splitter 1.

(2) Further, according to the present embodiment, as illustrated in FIG. 1, the optical splitter 1 includes the filter switching mechanism 7. The filter switching mechanism 7 switches between the plurality of optical filters 6 to dispose any one of the optical filters 6 between the emission unit 4 (emission slit 41) and the diffraction grating 5.

Therefore, it is possible to select and use the optical filter 6 of a predetermined wavelength range from among the plurality of optical filters 6 in the optical splitter 1.

4. Modified Example

In the above-described embodiment, the anti-reflection coating 62 has been described as being formed only on one surface of the filter main body 61. However, the entire surface of the filter main body 61 may be coated with the anti-reflection coating 62. In this way, the anti-reflection coating 62 can be easily formed on the filter main body 61.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical splitter comprising:
    a housing into which light is incident and which emits the incident light from an emission slit;
    a diffraction grating provided in the housing and configured to disperse the light incident into the housing into light by wavelength; and
    an optical filter provided between the diffraction grating and the emission slit and configured to transmit only light of a selected wavelength to emit the light from the emission slit, wherein
    an anti-reflection coating is formed on a surface of the optical filter at least on the emission slit side and faces the emission slit, wherein the light is inhibited from repeating reflection between the emission unit and the optical filter by the anti-reflection coating formed on the surface of the optical filter at least on the emission slit side, and
    from the light dispersed by the diffraction grating and having passed through the optical filter, the light reflected by the emission slit passes through the optical filter.

2. The optical splitter according to claim 1, further comprising:
    a filter switching mechanism which switches between a plurality of optical filters to dispose any one of the optical filters between the diffraction grating and the emission slit, wherein
    the anti-reflection coating is formed on a surface of each of the optical filters at least on the emission slit side.

* * * * *